United States Patent [19]

Tiedemann

[11] Patent Number: 4,564,447
[45] Date of Patent: Jan. 14, 1986

[54] PURIFICATION APPARATUS

[75] Inventor: Wolfgang Tiedemann, Sigtuna, Sweden

[73] Assignee: VICO Kemisk Tekniska Fabrik AB, Bandhagen, Sweden

[21] Appl. No.: 577,620

[22] PCT Filed: Jun. 2, 1983

[86] PCT No.: PCT/SE83/00222
§ 371 Date: Jan. 20, 1984
§ 102(e) Date: Jan. 20, 1984

[87] PCT Pub. No.: WO83/04185
PCT Pub. Date: Dec. 8, 1983

[30] Foreign Application Priority Data

Jun. 4, 1982 [SE] Sweden ................. 8203481

[51] Int. Cl.[4] .................... C02F 1/20; B01D 3/00
[52] U.S. Cl. .................... 210/220; 261/124; 55/196
[58] Field of Search ........... 210/703, 718, 750, 188, 210/220, 221.2; 55/196, 53, 38; 261/124, 148, 126

[56] References Cited

U.S. PATENT DOCUMENTS

| | | | |
|---|---|---|---|
| 1,598,858 | 9/1926 | Greenwalt | 261/124 |
| 2,005,422 | 6/1935 | Hunicke et al. | 252/7 |
| 2,718,275 | 9/1955 | Banks | 55/53 |
| 3,450,603 | 6/1969 | Meyers et al. | 203/18 |
| 4,076,617 | 2/1978 | Bybel et al. | 261/124 |
| 4,415,341 | 11/1983 | Echtler | 55/196 |

FOREIGN PATENT DOCUMENTS

| | | | |
|---|---|---|---|
| 824786 | 12/1951 | Fed. Rep. of Germany. | |
| 2063937 | 7/1972 | Fed. Rep. of Germany. | |
| 157915 | 3/1954 | Sweden | 261/124 |
| 742284 | 12/1955 | United Kingdom | 261/148 |
| 990678 | 1/1983 | U.S.S.R. | 210/703 |

Primary Examiner—Benoit Castel
Attorney, Agent, or Firm—Burns, Doane, Swecker & Mathis

[57] ABSTRACT

An apparatus for high-degree purification of liquid contaminated by solvent comprises a vessel (1) of flat configuration, the liquid (16) being caused to flow through the vessel at a given level (17) determined by an overflow (19) or the like. The liquid flows in a thin stratum above holed air outlet elements (21) separated by liquid compartments (23), said elements (21) distributing the purification air uniformly in the liquid in the form of small bubbles. The elements (21) preferably have the form of perforated tubes, arranged separated and in parallel transversely across the bottom (11) of the vessel. The residue concentration of solvent in the outlet water can be kept under 1 ppm.

5 Claims, 4 Drawing Figures

PURIFICATION APPARATUS

TECHNICAL FIELD

The present invention relates to an apparatus for purifying liquid contaminated by solvents, particularly water contaminated by solvents of the chlorinated, fluorinated or aromatic hydrocarbon type, such as trichloroethylene and xylene.

TECHNOLOGICAL BACKGROUND

In industry, there is often water contaminated with small amounts of solvent of the mentioned kind. There are no effective and economic aids in the art today, for high-degree purification of such water, the contaminated water therefore often being led off without purification, in contravention to current regulations.

In this connection it has indeed been proposed to purify water burdened with solvent by utilizing so-called strip columns. However, these are expensive and complicated, and it has been found impossible to reduce the solvent concentration to below 5 ppm thereby.

OBJECT OF INVENTION

The object of the present invention is to provide a new apparatus for purification of the kind mentioned in the introduction, which inter alia gives the following substantial improvements and advantages;
 enables purification to solvent concentrations below 1 ppm;
 is constructively very simple and therefore easy to manufacture and consequently cheap, so that purification of the kind discussed here can be applied more generally;
 is conservative of energy in that it requires comparatively small amounts of purification air, which does not normally need to be heated;
 is excellently suited to handle intermittent flows of contaminated liquid;
 functions "horizontally", connections in series and/or parallel being simple, in contradistinction to what is the case in conjunction with columns operating vertically and on the counter-flow principle.

SUMMARY OF INVENTION

The above-mentioned object is achieved in accordance with the invention by an apparatus having the distinguishing features disclosed in the appended claims.

The apparatus in accordance with the invention is thus substantially distinguished in that it comprises a container or vessel with an inlet for contaminated liquid at an inlet end and an outlet for purified liquid at an opposing outlet end, the vessel being adapted such that the liquid flows generally horizontally therein; means in conjunction with the outlet for maintaining the liquid flowing through the vessel at a given level, at least over a working section; means arranged in the working section for being flowed over by the liquid at a small depth and for being supplied with cleaning air such as to cause the latter to pass upwards in finely divided form through the liquid flowing past, thus to entrain and remove from the liquid contaminating solvent dissolved therein, said means including a plurality of transversely arranged, localized, air output members separated by liquid pockets and with a large number of air output orifices, which are uniformly distributed over the working section flowed over by the liquid, and which are disposed at a given distance below the liquid level determined by said means at the outlet for maintaining liquid level; and means for leading air away from the vessel, preferably to a carbon filter, said air having been emitted from the air outlet members and having entrained solvent on its passage through the liquid.

In accordance with the invention, an excellent gain is obtained between the liquid and gas phase, by "fresh" air being pressed or evacuated out through a finely and uniformly distributing system of small orifices (with a typical diameter of about 1 mm), this air passing through a comparatively very thin (typical thickness 5–10 mm) layer of water moving past, which is kept within predetermined limits. The air passes out from the orifices in the form of a large number of small bubbles which are uniformly distributed in the liquid flowing past. In this respect it may be advantageous to form or arrange the orifices such that the bubbles have a tendency to whirl round or rotate in the liquid. In accordance with the invention, the liquid is not given the opportunity of flowing quietly and uniformly directly through the vessel, but after passage over an air outlet member it is force-agitated and possibly caused to reside in spaces of the "blind alley" type, whereby an evening-out of the concentration of remaining contaminating solvent is obtained.

To obtain the best purification effect, the liquid level above the orifices, the air quantity passing per time unit and the liquid quantity flowing through per time unit should be related to each other.

It has been found advantageous that said air outlet members comprise a large number of tubular elements, extending parallel and transversely relative the liquid flow direction over the working section in the vessel, said elements being provided with air outlet orifices in their upward portions, particularly their uppermost surface. The elements preferably have an upwardly curved upper side, air outlet orifices being disposed on both sides of the uppermost top portion of the elements. In particular, the elements can be ordinary pipes of round cross-section. Air outlet members of this kind, each fed uniformly with "fresh" cleaning air, have been found to give very good air distribution in the liquid. For good air distribution and a good reproducible cleaning effect it is also advantageous that the pressure drop for the cleaning air lies substantially in the orifices.

The air outlet members can to advantage be placed tightly against the bottom of the vessel and be separated such that there are thus formed spaces of the "blind alley" type between the members. This contributes to giving the liquid an advantageous residence time in the vessel and good mixing during passage through the vessel.

The working section of the vessel may to advantage be divided into a plurality of sub-sections, each including a plurality of air outlet members, a barrier preventing the liquid flow being arranged between adjacent sub-sections, the level of said barrier lying between the level determined by said level-maintaining outlet means and the level of the orifices. Such a division makes the apparatus better suited to the reception of intermittent liquid flows, and contributes to improving the agitation of the liquid in the vessel.

Agitation between the liquid and rising air bubbles can be improved by directing the orifices slopingly in relation to a vertical line, so that the bubbles will be given a tendency to whirl round in the liquid.

The apparatus in accordance with the invention may be said to include a plurality of purification steps placed in line one after the other and in one and the same vessel, in which liquid to be purified appears to pass uninteruptedly through the different purification steps, although each purification step treats the liquid separately with separate fresh air, and the liquid is agitated after each treatment, without the purification steps needing to be particularly mechanically separated from each other.

In other words it is a question of an apparatus functioning with separate series-connected purification steps, which are fed with fresh air simultaneously and in parallel.

Further distinguishing for the apparatus in accordance with the invention is that although the water level over the air outlet orifices is low, which is essential, the liquid quantity in the vessel (and thereby the residence time) may be relatively large, this relatively large liquid quantity being effectively mixed even so.

Further distinguishing features of an apparatus in accordance with the present invention will be apparent from the following description of a preferred embodiment, while referring to the appended drawing.

DESCRIPTION OF EMBODIMENT

Figure 1:
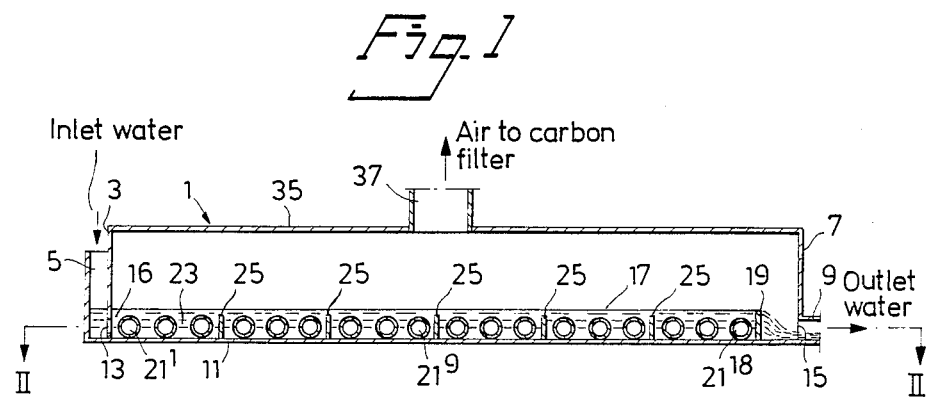
FIG. 1 is a schematic, vertical central longitudinal sectional view of an apparatus in accordance with the invention.
Figure 2:
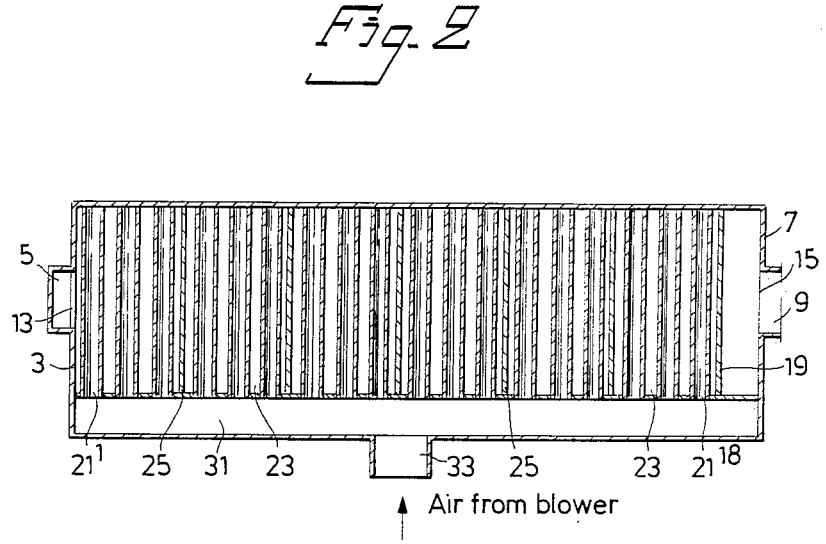
FIG. 2 is a schematic, horizontal sectional view of the apparatus in FIG. 1, taken along line II—II in FIG. 1.

The apparatus in accordance with the invention, illustrated in FIG. 1, comprises an elongate, parallelepipedic closed vessel 1. A water inlet 5 is arranged at one end wall 3 of the vessel, and at its opposite end wall 7 the vessel has a water outlet 9. Inlet 5 has the form of an exterior pocket supplied from above and in communication with the interior of vessel 1 at the bottom 11 of the vessel via an opening 13 in the end wall 3. The outlet 9 includes an opening 15 in end wall 3 arranged in a corresponding manner. In front of outlet 9 there is an overflow 19 for regulating the water level 17 inside the vessel, and in the form of a barrier tightly connected to the vessel bottom and extending transversely over the whole of the vessel. The hight of inlet opening 13 is such that the opening is well below water level 17. On bottom 11 of the vessel there are disposed air outlet members in the form of tubes 21 holed on their upper part. Tubes 21 are tightly adjacent bottom 11 of the vessel and extend transversely over the whole of the vessel. The tubes are mutually parallel and with mutual spacing 23. The 18 tubes $21^1$–$21^{18}$ are divided into sub-sections of three tubes each with the aid of section barriers 25 having a height substantially corresponding to, or somewhat greater than the diameter of tubes 21. A division into sections of this kind contributes to the apparatus functioning excellently, even for intermittent supply of contaminated water 16 through inlet 5.

Tubes 21 are supplied uniformly with air under pressure from an air distribution box 31 arranged along one long side of vessel 1, this box being in turn supplied with fresh cleaning air from an unillustrated blower via an air inlet 33. The air emitted by the holed tubes 21 for entraining contaminants in the water 16 is collected in the closed vessel 1 and departs via an air outlet 37 in the roof 35 of the vessel. The contaminated air can be taken to a carbon filter, or instance, for separating entrained, contaminating solvent.

Figure 3:
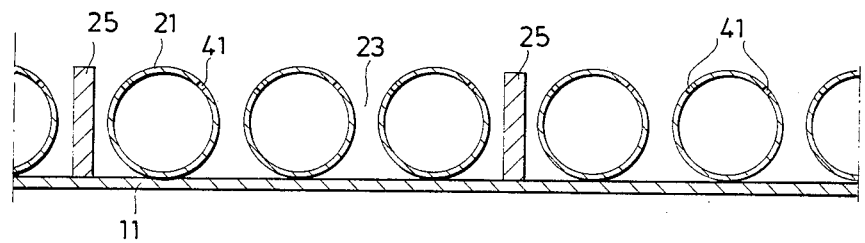
FIG. 3 is an enlarged, vertical partial sectional view more closely illustrating the arrangement of tubular air outlet members and sub-section barriers.
Figure 4:
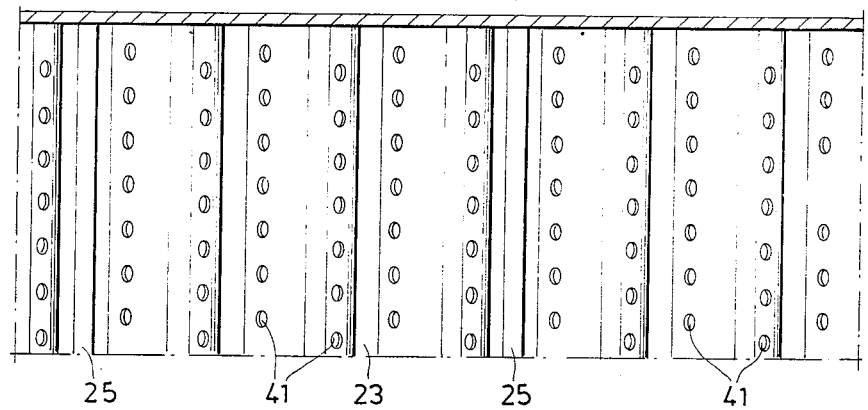
FIG. 4 is an enlarged view from above of the arrangement illustrated in FIG. 3.

The arrangement of orifices or holes 41 in tubes 21 will be more closely seen from FIGS. 3 and 4. The orifices 41 are substantially evenly distributed in the horizontal plane and are made a distance down on the downwarly curving sides of tubes 21. In the illustrated embodiment the axes of orifices 41 form approximately 45° with a vertical line, whereby the air bubbles leaving the orifices will be given a tendency to whirl round in water 16, with improved entraining of solvent as a result.

EXAMPLE

An apparatus with the general configuration illustrated in FIGS. 1–4 had a width of 300, a length of 1000 and a height of 220 mm, and contained seven sub-sections of three tubes each. Tube diameter was 25 mm and the orifice diameter was 1–2 mm. The number of orifices per tube was 13+14=27. The water level above the orifices was typically 5–10 mm. Water contaminated with trichloroethylene to an amount of about 1000 mg per liter water was treated in the apparatus. The air flow through the apparatus was about 80 m$^3$/h. With these conditions it was found that for water flows of up to at least about 200 liters per hour the residue concentration of trichloroethylene in the outlet water was well below 1 mg per liter.

I claim:

1. Apparatus for purifying liquid contaminated by a solvent of at least one of the chlorinated or fluorinated hydrocarbon types, comprising a vessel adapted to receive a contaminated liquid with an inlet for receiving said contaminated liquid at an inlet end and an outlet for discharging purified liquid at an outlet end positioned opposite the inlet end, the vessel being arranged so that the liquid flows generally horizontally therethrough, means provided in conjunction with the outlet for maintaining the liquid flow through the vessel at a predetermined level, at least over a working section of the vessel, means arranged in the working section for being covered by the liquid at a shallow depth and for being supplied with cleaning air so as to cause the air to flow upwardly in finely divided form through the liquid flow and remove contaminating solvent dissolved in said liquid, said means for being covered by the liquid and for being supplied with cleaning air including a plurality of transversely arranged localized air outlet elements with intermediate liquid compartments and a large number of air outlet orifices distributed over the working section and arranged at a distance of approximately 5 to 15 mm below the liquid level as determined by said means for maintaining the liquid level when said vessel is in an operative state, the working section being divided into a plurality of sub-sections, each sub-section provided with a number of said plurality of air outlet elements and a barrier provided between contiguous sub-sections, said air outlet elements including a plurality of tubular portions operatively connected to a source of air, said portions extending transversely to the flow direction of the liquid over the working section, the air outlet elements having upwardly curved upper sides which meet and define an uppermost top section of the air outlet elements and air outlet orifices arranged on the upper sides with the uppermost top section between the orifices, the air outlet elements being separated so as to define free compartments formed therebetween for the liquid and being tightly connected to a bottom side of the vessel at bottom sides of the air outlet elements, and means for taking air away from the vessel, said air having passed through the liquid and the entrained solvent.

2. Apparatus as claimed in claim 1, wherein the air outlet elements are tubes of round cross-section.

3. Apparatus as claimed in claim 2, wherein the tubes are parallel and closely adjacent a flat, horizontal bottom of the vessel.

4. Apparatus as claimed in claim 1, wherein the air outlet elements are connected to an air distribution inlet box alone one side of the vessel.

5. Apparatus as claimed in claim 1, wherein the air outlet orifices are directed obliquely in relation to a vertical line.

* * * * *